(12) United States Patent
Kitazato

(10) Patent No.: US 11,082,340 B2
(45) Date of Patent: Aug. 3, 2021

(54) TRANSMITTING APPARATUS, TRANSMITTING METHOD, AND RECEIVING APPARATUS

(71) Applicant: SONY CORPORATION, Tokyo (JP)

(72) Inventor: Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/313,610

(22) PCT Filed: May 19, 2015

(86) PCT No.: PCT/JP2015/064385
§ 371 (c)(1),
(2) Date: Nov. 23, 2016

(87) PCT Pub. No.: WO2015/190247
PCT Pub. Date: Dec. 17, 2015

(65) Prior Publication Data
US 2017/0195223 A1 Jul. 6, 2017

(30) Foreign Application Priority Data

Jun. 10, 2014 (JP) .............................. JP2014-119290

(51) Int. Cl.
*H04L 12/741* (2013.01)
*H04N 21/643* (2011.01)
(Continued)

(52) U.S. Cl.
CPC ............. *H04L 45/74* (2013.01); *H04H 20/95* (2013.01); *H04H 60/07* (2013.01); *H04L 67/06* (2013.01);
(Continued)

(58) Field of Classification Search
CPC ......... H04L 45/74; H04L 69/22; H04L 67/06; H04N 21/64322; H04N 21/434; H04N 21/236; H04H 20/95; H04H 60/07
See application file for complete search history.

(56) References Cited

U.S. PATENT DOCUMENTS 9,183,218 B1 * 11/2015 Wallace .............. G06F 16/1748
2003/0021298 A1 * 1/2003 Murakami ........... G11B 27/105
370/535
(Continued)

FOREIGN PATENT DOCUMENTS

CN 101136235 A 3/2008
CN 101977326 A 2/2011
(Continued)

OTHER PUBLICATIONS

"Information technology—High efficiency coding and media delivery in heterogeneous environments—Part 1: MPEG media transport (MMT)", ISO/IEC 2013, Apr. 26, 2013, pp. 98.

(Continued)

*Primary Examiner* — Andrew Lai
*Assistant Examiner* — Chuong M Nguyen
(74) *Attorney, Agent, or Firm* — Chip Law Group

(57) ABSTRACT

The present invention relates to a transmitting apparatus, a transmitting method, and a receiving apparatus that are to preferably transmit content composed of a file. A transmission stream is transmitted to a reception side through a predetermined transmission path. In the transmission stream, a first transmission packet including transmission media and a second transmission packet including information related to the transmission media are time-division multiplexed. When the transmission media included in the first transmission packet is divided data of a file that composes predetermined content, identification information for identifying divided data included in the first transmission (Continued)

packet is inserted into the first transmission packet and the second transmission packet.

13 Claims, 15 Drawing Sheets

(51) Int. Cl.
<table>
<tr><td>H04N 21/434</td><td>(2011.01)</td></tr>
<tr><td>H04H 20/95</td><td>(2008.01)</td></tr>
<tr><td>H04N 21/236</td><td>(2011.01)</td></tr>
<tr><td>H04H 60/07</td><td>(2008.01)</td></tr>
<tr><td>H04L 29/08</td><td>(2006.01)</td></tr>
<tr><td>H04L 29/06</td><td>(2006.01)</td></tr>
</table>

(52) U.S. Cl.
CPC ........... *H04L 69/22* (2013.01); *H04N 21/236* (2013.01); *H04N 21/434* (2013.01); *H04N 21/64322* (2013.01)

(56) References Cited

U.S. PATENT DOCUMENTS

<table>
<tr><td>2006/0018479 A1</td><td>1/2006</td><td>Chen</td><td></td></tr>
<tr><td>2006/0184790 A1*</td><td>8/2006</td><td>Oliveira</td><td>H04N 21/23476<br>713/160</td></tr>
<tr><td>2014/0108620 A1</td><td>4/2014</td><td>Park et al.</td><td></td></tr>
<tr><td>2014/0133489 A1*</td><td>5/2014</td><td>Bae</td><td>H04L 47/34<br>370/392</td></tr>
<tr><td>2014/0241421 A1*</td><td>8/2014</td><td>Orton-Jay</td><td>H04N 19/124<br>375/240.03</td></tr>
<tr><td>2014/0313916 A1*</td><td>10/2014</td><td>Hwang</td><td>H04N 21/643<br>370/252</td></tr>
<tr><td>2014/0317664 A1*</td><td>10/2014</td><td>Park</td><td>H04N 21/4381<br>725/109</td></tr>
<tr><td>2015/0032845 A1*</td><td>1/2015</td><td>Bouazizi</td><td>H04L 65/4069<br>709/217</td></tr>
<tr><td>2015/0117452 A1*</td><td>4/2015</td><td>Mosko</td><td>H04L 69/166<br>370/392</td></tr>
<tr><td>2015/0156519 A1*</td><td>6/2015</td><td>Watanabe</td><td>H04N 5/77<br>725/116</td></tr>
</table>

FOREIGN PATENT DOCUMENTS

<table>
<tr><td>JP</td><td>2009-171294 A</td><td>7/2009</td></tr>
<tr><td>JP</td><td>2013-153291 A</td><td>8/2013</td></tr>
<tr><td>WO</td><td>2012/173389 A2</td><td>12/2012</td></tr>
</table>

OTHER PUBLICATIONS

"Information technology—High efficiency coding and media delivery in heterogeneous environments—Part 1: MPEG media transport (MMT)", ISO/IEC DIS 23008-1(E), Apr. 26, 2013, 98 pages.

"Information technology—Coding of audio-visual objects", ISO/IEC 14496-12:2012(E), Jul. 15, 2012, 196 pages.

Extended European Search Report of EP Patent Application No. 15806281.0, dated Dec. 1, 2017, 13 pages.

Bouazizi, et al., "Proposed Changes to MMTP and Payload Format", ISO/IEC JTC1/SC29/WG11 MPEG2013/m29432, Jul. 2013, 18 pages.

Office Action for CN Patent Application No. 201580029446X, dated Mar. 4, 2019, 07 pages of Office Action and 08 pages of English Translation.

Office Action for JP Patent Application No. 2016-527716, dated Mar. 5, 2019, 03 pages of Office Action and 03 pages of English Translation.

"Information Technology—Coding of Audio-Visual Objects—Part 12: ISO Base Media File Format", ISO/IEC 14496-12, Sep. 12, 2015, pp. 1-196.

Office Action for BR Patent Application No. 112016028394-5 dated Sep. 24, 2020, 4 pages of Office Action and 2 pages of English Translation.

Office Action for JP Patent Application No. 2019-132297, dated Oct. 20, 2020, 02 pages of English Translation and 03 pages of Office Action.

* cited by examiner

FIG. 10

| Syntax | No. of bits | Mnemonic |
|---|---|---|
| Data_Transmission_message(){ | | |
|   message_id | 16 | uimsbf |
|   version | 8 | uimsbf |
|   length | 32 | uimsbf |
|   num_of_tables | 8 | uimsbf |
|   for (i=0; i<num_of_tables;i++){ | | |
|     table_id | 8 | uimsbf |
|     table_version | 8 | uimsbf |
|     table_length | 16 | uimsbf |
|   } | | |
|   for (i=0; i<num_of_tables; i++){ | | |
|     table() | | uimsbf |
|   } | | |
| } | | |

FIG. 11

| Syntax | No. of bits | Mnemonic |
|---|---|---|
| Data_Asset_Management_Table(){ | | |
|   table_id | 8 | uimsbf |
|   version | 8 | uimsbf |
|   length | 16 | uimsbf |
|   number_of_asset | 8 | uimsbf |
|   for(k=0;k<number_of_asset;k++){ | | |
|     download_id | 32 | uimsbf |
|     asset_ID_scheme | 32 | uimsbf |
|     asse_ID_length | 8 | Uimsbf |
|     for(i=0;i<asset_ID_length;i++){ | | |
|       asset_ID_byte | 8 | uimsbf |
|     } | | |
|     number_of_items | 8 | uimsbf |
|     for (i=0;i<number_of_items;i++){ | | |
|       item_ID | 32 | uimsbf |
|       item_tag | 16 | uimsbf |
|       item_size | 32 | uimsbf |
|       item_version | 8 | uimsbf |
|       item_checksum | 32 | uimsbf |
|       item_info_length | 8 | uimsbf |
|       for(j=0;j<item_info_length;j++){ | | |
|         item_info () | | |
|       } | | |
|     } | | |
|     descriptor_loop_length | 16 | uimsbf |
|     for(j=0;j<descriptor_loop_length;j++){ | | |
|       descriptor() | | |
|     } | | |
|   } | | |
| } | | |

FIG. 12

| DATA CONFIGURATION | NUMBER OF BITS | DATA EXPRESSION |
|---|---|---|
| Item_concatenation_descriptor(){ | | |
| descriptor_tag | 16 | uimsbf |
| descriptor_length | 8 | uimsbf |
| concatenated_item_version | 8 | bslbf |
| concatenated_item_size | 32 | uimsbf |
| total_number_of_fragments | 32 | uimsbf |
| end_item_id | 32 | uimsbf |
| } | | |

FIG. 13 concatenated_item_version (COMBINED ITEM VERSION NUMBER):
    VERSION NUMBER OF ENTIRE COMBINED ITEM.
    IT CHANGES WHEN ITEM VERSION OF ANY OF COMPOSING ITEMS CHANGES concatenated_item_size (COMBINED ITEM SIZE):
    OVERALL SIZE OF COMBINED ITEM. IT IS EXPRESSED IN KILOBYTES total_number_of_fragments (FRAGMENT TOTAL NUMBER):
    NUMBER OF FRAGMENTS OF ENTIRE COMBINED ITEMS end_item_id (COMBINING-END ITEM ID):
    LAST COMBINED aitem_id. ITEMS ARE COMBINED IN
    ORDER OF SERIAL NUMBERS OF item_id, HAVING ITEM
    IN WHICH ITS DESCRIPTOR IS SET AS FIRST ITEM.

TRANSMITTING APPARATUS, TRANSMITTING METHOD, AND RECEIVING APPARATUS

CROSS REFERENCE TO RELATED APPLICATIONS

This application is a U. S. National Phase of International Patent Application No. PCT/JP2015/064385 filed on May 19, 2015, which claims priority benefit of Japanese Patent Application No. JP 2014-119290 filed in the Japan Patent Office on Jun. 10, 2014. Each of the above-referenced applications is hereby incorporated herein by reference in its entirety.

TECHNICAL FIELD

The present technology relates to a transmitting apparatus, a transmitting method, and a receiving apparatus. Particularly, the present technology relates to a transmitting apparatus or the like for transmitting content composed of a file.

BACKGROUND ART

In a current broadcasting system, as a media transport method, moving picture experts group-2 transmission stream (MPEG-2 TS) system and real time protocol (RTP) system are widely used (for example, see Patent Document 1).

As a next generation digital broadcasting system, MPEG media transport (MMT) standardized as a new media transport system using MPEG (for example, see Non-Patent Document 1) has been studied.

In a case that a file is transmitted using MMT, when a file is divided so as to make a single MMT/IP packet length about 4 KB to transmit, since there is an 8-bit fragment counter as index information under existing conditions, an index can be attached only to a file having a maximum of 1 MB or so.

In accumulation-type broadcasting, it is assumed that the order of gigabyte files are transmitted. Regarding the files used in data broadcasting, JPEG files of one or more megabyte are surely conceivable. When transmitting in broadcasting, index information for dividing and transmitting a larger file is required, assuming a case of starting to receive from midstream of a fragmented file transmission or a case of having a midstream file skipped during the transmission due to a bad weather.

CITATION LIST

Patent Document

Patent Document 1: Japanese Patent Application Laid-Open No. 2013-153291

Non-Patent Document

Non-Patent Document 1: ISO/IEC FDIS 23008-1:2013(E) Information technology-High efficiency coding and media delivery in heterogeneous environments—Part 1: MPEG media transport (MMT)

SUMMARY OF THE INVENTION

Problems to be Solved by the Invention

An object of the present technology is to preferably transmit content composed of a file.

Solutions to Problems

A concept of the present technology lies in a transmitting apparatus including:

a transmission stream generating unit configured to generate a transmission stream in which a first transmission packet including transmission media and a second transmission packet including information related to the transmission media are time-division multiplexed; and a transmission stream transmitting unit configured to transmit the transmission stream to a reception side through a predetermined transmission path, wherein, when the transmission media included in the first transmission packet is divided data of a file that composes predetermined content, the transmission stream generating unit disposes, in a header of the first transmission packet, an extension header having order information that indicates an order of the divided data included in the first transmission packet and total number information that indicates a total number of the divided data.

According to the present technology, a transmission stream generating unit generates a transmission stream in which a first transmission packet including transmission media and a second transmission packet including information related to the transmission media are time-division multiplexed. For example, it may be made that the transmission packets are MPEG media transport (MMT) packets. The transmission stream transmitting unit transmits the transmission stream to a reception side through a predetermined transmission path.

When the transmission media included in the first transmission packet is divided data of a file that composes predetermined content, order information that indicates an order of the divided data included in the first transmission packet and total number information that indicates a total number of the divided data are inserted to the first transmission packet. The order information and total number information are inserted to an extension header of the first transmission packet. For example, it may be made that the transmission packets are MMT packets.

In this manner, according to the present technology, an extension header having order information that indicates an order of the divided data included in the first transmission packet and total number information that indicates a total number of the divided data is inserted to a header of the first transmission packet. Thus, in the reception side, even when the file size is large and the total number of dividing is large, each divided data can be identified and this makes it easier to obtain all divided data and reconfigure the file.

Further, another concept of the present technology lies in a receiving apparatus including a transmission stream receiving unit configured to receive, from a transmission side through a predetermined transmission path, a transmission stream in which a first transmission packet including transmission media and a second transmission packet including information related to the transmission media are time-division multiplexed, wherein, when the transmission media included in the first transmission packet is divided data of a file that composes predetermined content, an extension header having order information that indicates an order of the divided data included in the first transmission packet and total number information that indicates a total number of the divided data is disposed in a header of the first transmission packet, the receiving apparatus further including a file acquisition unit configured to acquire, from the transmission stream, the file by filtering the first transmission packets that respectively include each divided data of the file that composes the predetermined content based on the order information and the total number information.

According to the present technology, a transmission stream receiving unit receives a transmission stream from a transmission side through a predetermined transmission path. In the transmission stream, a first transmission packet including transmission media and a second transmission packet including information related to the transmission media are time-division multiplexed. Then, when the transmission media included in the first transmission packet is divided data of a file that composes predetermined content, an extension header having order information that indicates an order of the divided data included in the first transmission packet and total number information that indicates a total number of the divided data is placed in a header of the first transmission packet.

The file acquisition unit acquires, from the transmission stream, the file that composes the predetermined content. In this case, the order information and total number information included in the first transmission packet are used to filter the first transmission packets respectively including each piece of the divided data of the file that composes the predetermined content and the file is acquired.

In this manner, according to the present technology, in a header of the first transmission packet, an extension header having order information that indicates an order of the divided data included in the first transmission packet and total number information that indicates a total number of divided data is placed. Thus, even when the file size is large and the total number of dividing is large, each piece of the divided data can be identified and this makes it easier to obtain all divided data and reconfigure the file.

Further, another concept of the present technology lies in a transmitting apparatus including:

a transmission stream generating unit configured to generate a transmission stream in which a first transmission packet including transmission media and a second transmission packet including information related to the transmission media are time-division multiplexed; and a transmission stream transmitting unit configured to transmit the transmission stream to a reception side through a predetermined transmission path, wherein, when the transmission media included in the first transmission packet is divided data of a file that composes predetermined content and a total number of dividing exceeds a predetermined number, the transmission stream generating unit divides the file into a plurality of files so that the number of the respectively included divided data becomes equal to or less than the predetermined number, and inserts concatenation information of the plurality of files in the second transmission packet.

According to the present technology, a transmission stream generating unit generates a transmission stream in which a first transmission packet including transmission media and a second transmission packet including information related to the transmission media are time-division multiplexed. For example, it may be made that the transmission packets are MPEG media transport (MMT) packets. The transmission stream transmitting unit transmits the transmission stream to a reception side through a predetermined transmission path.

When the transmission media included in the first transmission packet is divided data of a file that composes predetermined content and the total number of dividing exceeds the predetermined number, the file is divided into a plurality of files so that the number of respectively included divided data becomes equal to or less than the predetermined number and concatenation information of the plurality of files is inserted to the second transmission packet. For example, it may be made that the transmission packets are MMT packets and the predetermined number is 256.

Further, it may be made that, when the transmission packets are MMT packets, the concatenation information of the plurality of files is inserted to a data asset management table included in a data transmission message. In this case, for example, it may be made that serial file identifiers are applied to the plurality of files, that the concatenation information of the plurality of files is inserted to the data asset management table as information of the first file of the plurality of files, and that the concatenation information of the plurality of files includes the file identifier of the last file of the plurality of files.

In this manner, according to the present technology, when the total number of the file division exceeds the predetermined number, the file is divided into a plurality of files so that the number of respectively included divided data becomes equal to or less than the predetermined number and the concatenation information of the plurality of files is inserted to the second transmission packet. Thus, in the reception side, even when the file size is large and the total number of dividing is large, each piece of the divided data can be identified and this makes it easier to obtain all divided data and reconfigure the file.

Here, according to the present technology, for example, it may be made that the total number information that indicates the total number of the divided data is added to the concatenation information of the plurality of files. In this case, in the reception side, the total number of divided data can be easily recognized.

Further, another concept of the present technology lies in a receiving apparatus including:

a transmission stream receiving unit configured to receive, from a transmission side through a predetermined transmission path, a transmission stream in which a first transmission packet including transmission media and a second transmission packet including information related to the transmission media are time-division multiplexed, wherein, when the transmission media included in the first transmission packet is divided data of a file that composes predetermined content, and a total number of dividing exceeds a predetermined number, the file is divided into a plurality of files so that the number of the respectively included divided data becomes equal to or less than the predetermined number and concatenation information of the plurality of files is inserted in the second transmission packet, the receiving apparatus further including a file acquisition unit configured to acquire the file from the transmission stream by filtering the first transmission packets respectively including each divided data of the file that composes the predetermined content based on the concatenation information of the plurality of files.

According to the present technology, the transmission stream receiving unit receives a transmission stream from a transmission side through a predetermined transmission path. In the transmission stream, a first transmission packet including transmission media and a second transmission packet including information related to the transmission media are time-division multiplexed. Then, when the transmission media included in the first transmission packet is divided data of a file that composes predetermined content and a total number of dividing exceeds a predetermined number, the file is divided into a plurality of files so that the number of respectively included divided data becomes equal to or less than the predetermined number and concatenation information of the plurality of files is inserted in the second transmission packet.

The file acquisition unit acquires, from the transmission stream, the file that composes the predetermined content. In this case, the concatenation information of the plurality of files included in the second transmission packet is used to filter the first transmission packets including each piece of the divided data of the file that composes the predetermined content and the file is acquired.

In this manner, according to the present technology, when the total number of the file division exceeds the predetermined number, the file is divided into a plurality of files so that the number of respectively included divided data becomes equal to or less than the predetermined number and concatenation information of the plurality of files is inserted in the second transmission packet. Thus, even when the file size is large and the number of dividing is large, each piece of the divided data can be identified and this makes it easier to obtain all the divided data and reconfigure the file.

Effects of the Invention

According to the present technology, content composed of a file can be preferably transmitted. Here, the effects described in this specification are only examples and do not set any limitation, and there may be further additional effects.

BRIEF DESCRIPTION OF DRAWINGS

FIG. 10 is a diagram showing a configuration example of a data transmission message.

FIG. 11 is a diagram showing a configuration example of a data asset management table.

FIG. 12 is a diagram showing a configuration example of an item concatenation descriptor (item_concatenation_descriptor).

FIG. 13 is a diagram showing the content of major information in the configuration example of the item concatenation descriptor (item_concatenation_descriptor).

MODE FOR CARRYING OUT THE INVENTION

The followings are explanation of a configuration (hereinafter, referred to as "an embodiment") to implement the present invention. Here, the explanation will be given in the following order.
1. Embodiments
2. Modifications 1. Embodiments

Figure 1:
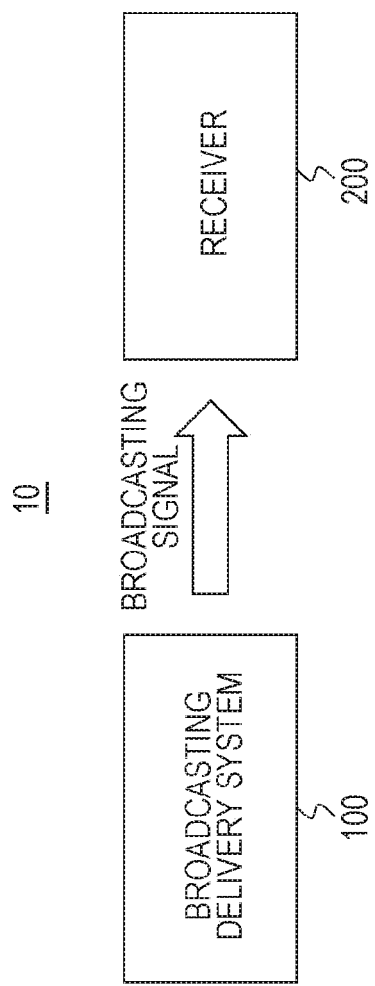
FIG. 1 is a block diagram showing a configuration example of a transmitting and receiving system as an embodiment.

[Configuration Example of Broadcasting System]
FIG. 1 shows a configuration example of a transmitting and receiving system 10 as an embodiment. The transmitting and receiving system 10 is composed of a broadcasting delivery system 100 and a receiver 200.

The broadcasting delivery system 100 transmits a broadcasting signal including transmission media of an Internet Protocol (IP) system. For the transmission media, there are timed media and non-timed media. For example, the timed media are stream data of video, audio, subtitles, and the like. Further, for example, the non-timed media are a file (file data) of HTML text data or other data.

The receiver 200 receives a broadcasting signal of the above described IP system, which is transmitted from the broadcasting delivery system 100. Then, the receiver 200 obtains timed media or non-timed media from the broadcasting signal and presents an image, a sound, and the like.

Figure 2:
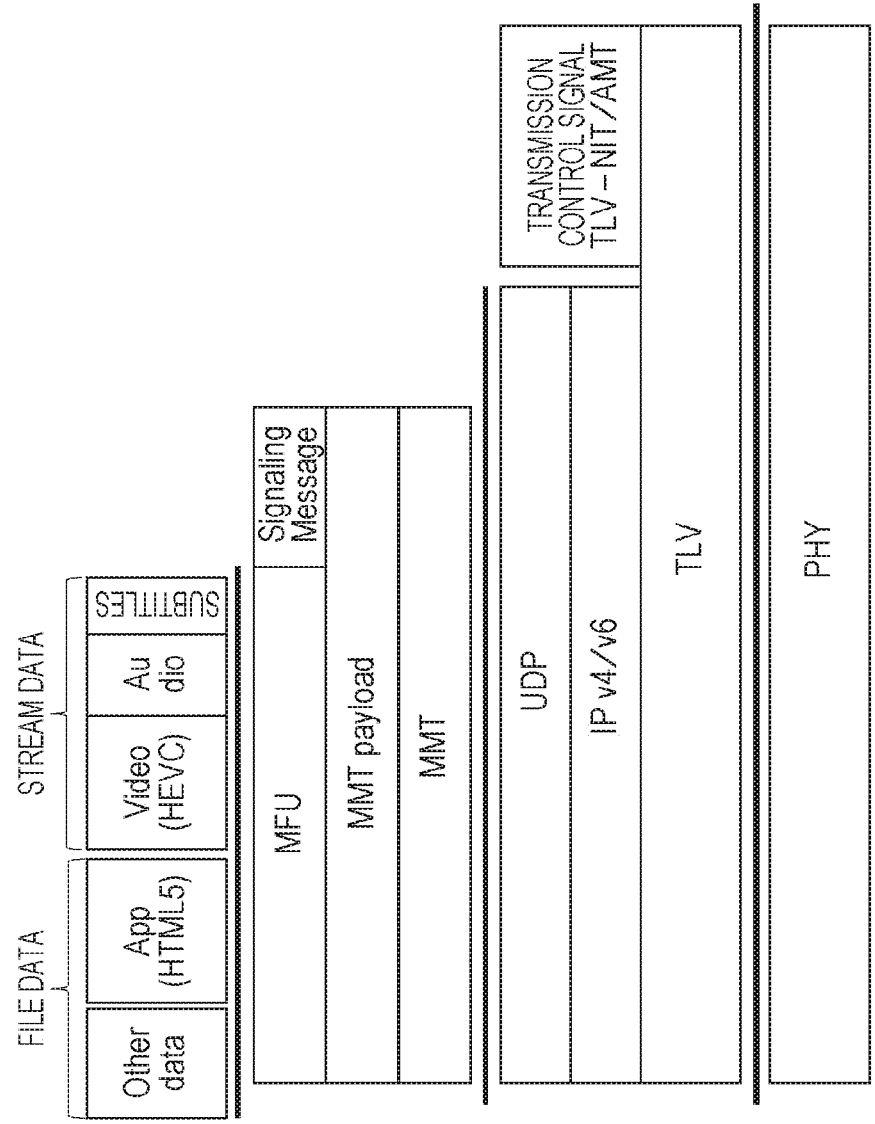
FIG. 2 is a stack model showing a configuration example of a broadcasting signal.

FIG. 2 is a stack model that shows a broadcasting signal configuration example. There is a physical layer (PHY) in a lower level. The physical layer includes a modulation system, an error correction system, and the like. Over the physical layer, there is a layer for transmission packet with a type length value (TLV). Over the transmission packet of the TLV, an IP packet is loaded. Over the IP packet, a user datagram protocol (UDP) is further loaded. On the other hand, over the transmission packet of the TLV, a transmission control signal is loaded as signaling information.

Further, over the UDP, an MMT packet is loaded. A payload unit of the MMT packet, an MMT Fragment Unit (MFU) or a signaling message is included. As the MFU, the stream data such as video, and audio and the file (file data) such as HTML document data or other data are inserted.

Figure 3:
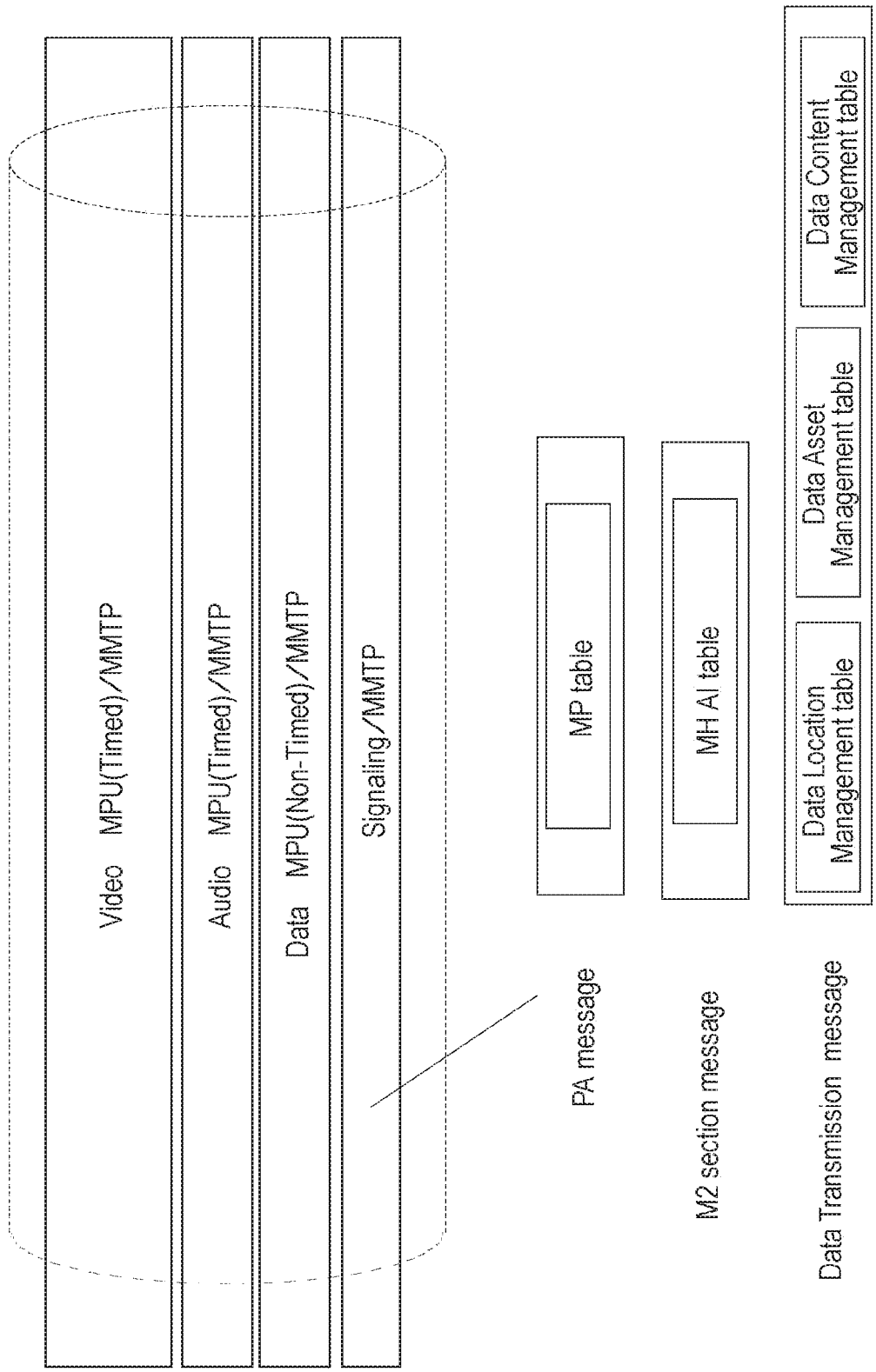
FIG. 3 is a diagram showing an image of a broadcasting signal of a single channel (a broadcasting program) transmitted from a broadcasting delivery system to a receiver.

FIG. 3 shows an image of a broadcasting signal of a single channel (broadcasting program) which is transmitted from the broadcasting delivery system 100 to the receiver 200. In the broadcasting signal, an MMT packet including a signaling message is included in addition to an MMT packet including timed media such as video and audio and an MMT packet including non-timed media such as file data.

As the signaling message, there are three types: a PA message, an M2 section message, and a data transmission message. In the PA message, an MP table or the like is included. In the M2 section message, an MH AI table or the like is included.

Further, in the data transmission message, a data location management table, a data asset management table, a data content management table, and the like are included.

FIGS. 4(a) to 4(e) show a configuration example of a transmission packet in the case of transmitting non-timed media. FIG. 4(a) shows files. F1 and F2 respectively show a single file. For example, F1 is a file used for one program and F2 is a file used for a next program.

Since the file F1 has a small file size, the entire file is disposed in the payload of the MFU, as shown in FIG. 4(b). On the other hand, the file F2 has a large file size, the file is divided into plural blocks, which are fragments, and the fragments are respectively disposed in the payload of the MFU, as shown in FIG. 4(b).

At the header of the MFU in which the files are disposed in the payload in this manner, there is a 32-bit field of "item_ID" which indicates a file ID. Here, the file IDs of the respective MFUs in which the files F1 and F2 are disposed in the payload have different values. Here, the file IDs of a plurality of MFUs where divided data (fragments) of F2-1 and F2-2 obtained by dividing the file F2 are disposed in the payload have the same value.

As shown in FIG. 4(c), an MMT payload header is added to the MFU, thereby configuring the MMTP payload. In this case, the size of the MFU including the file data of F1 is small and is therefore disposed in one MMTP payload. On the other hand, the MFUs including divided data of F2-1 and F2-2 are respectively placed in one MMTP payload. Then, as shown in FIG. 4(d), an MMT packet header (MMTP header) is further added to the MMTP payload, thereby configuring the MMT packet.

Figure 4:
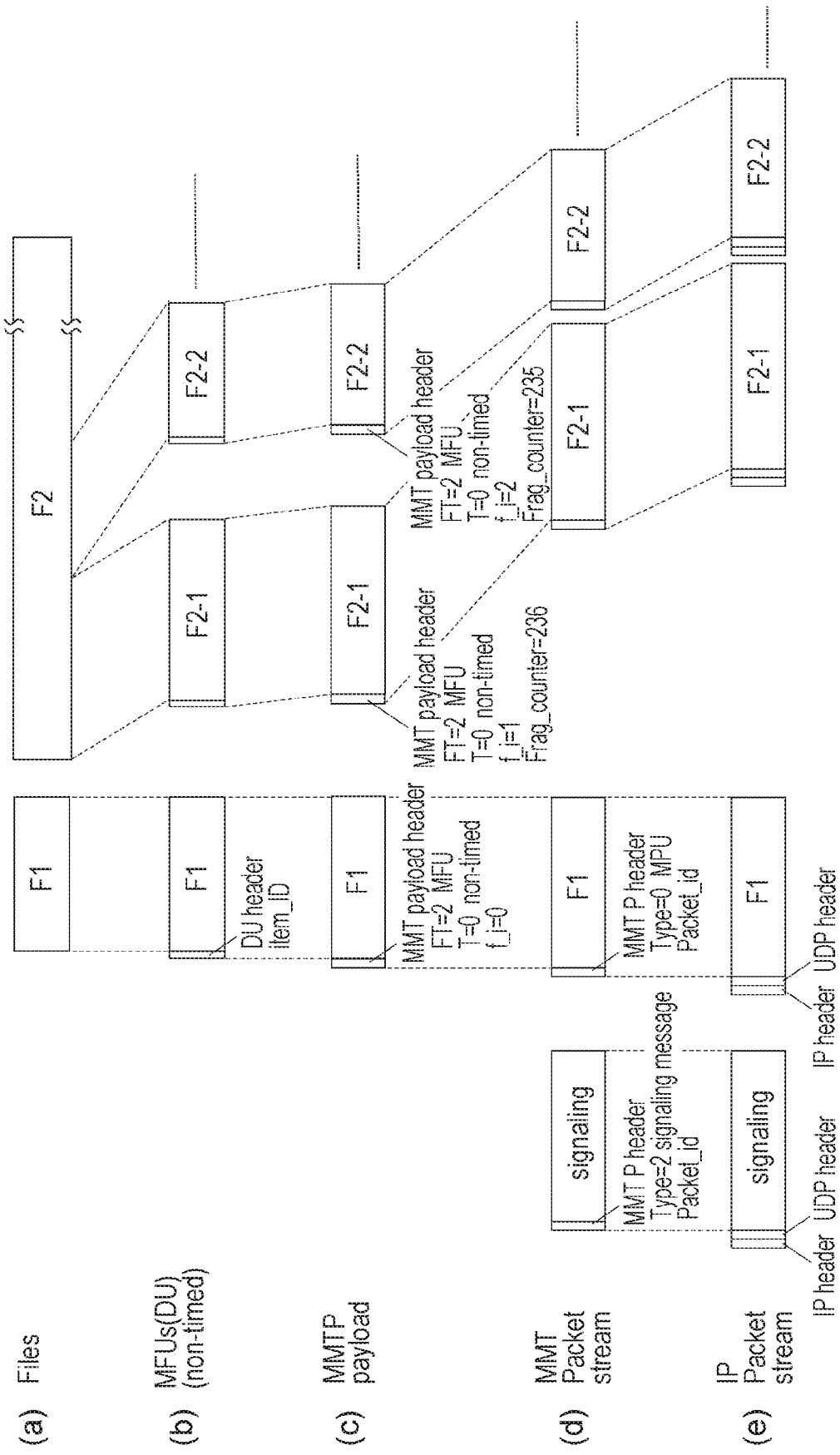
FIGS. 4(a) to 4(e) are diagrams showing a configuration example of a transmission packet when transmitting non-timed media.

As shown in FIG. 4 (d), among the MMT packets, there are some MMT packets that include a signaling message in its payload. Here, it is assumed that an 8-bit field of "Type" in the MMT payload header enables to identify whether the payload includes a signaling message or transmission media (stream data, file data).

As shown in FIG. 4 (e), the UDP header and the IP header are added to the MMT packet, thereby generating an IP packet. Further, although it is not shown, a TLV header is added to the IP packet and a TLV packet that composes a broadcast stream is generated.

FIG. 5(a) shows a configuration example of an MMT packet. The MMT packet is composed of an MMT packet header (MMTP header) and an MMTP payload. A 2-bit field of "V" indicates a version of an MMT protocol. As following the first edition of MMT standard, this file is set as "00." A 1-bit field of "C" indicates packet counter flag (packet_counter_flag) information and, when there is a packet counter flag, "1" is set. A 2-bit field of "FEC" indicates an FEC type (FEC_type).

A 1-bit field of "X" indicates extension header flag (extension flag) information and, when a header extension of the MMT packet is executed, "1" is set. In this case, there is a later described field of "header_extension." A 1-bit field of "R" indicates RAP flag (RAP_flag) information and, when the MMT payload transmitted by the MMT packet includes a beginning of a random access point, "1" is set.

A 6-bit field of "type" is payload type (payload_type) information and indicates data type of the MMTP payload. For example, "0x00" indicates that the payload is a media processing unit (MPU) and "0x02" indicates that the payload is a signaling message.

A 16-bit field of "packet_id" indicates a packet identifier (packet_id) for identifying a data type of the payload. A 32-bit field of "timestamp" indicates a type stamp for transmitting, that is, the time when the MMT packet is output from a transmission side. This time is expressed in an NTP short format. A 32-bit field of "packet_sequence_number" indicates a sequence number of the MMT packet that has the same packet identifier (packet_id). A 32-bit field of "packet_counter" indicates an order of the MMT packet in a same IP data flow regardless of the value of the packet identifier (packet_id).

When the above 1-bit flag information of "X" is "1," a field of "header_extension" which is an MMT extension header is placed after the 32-bit field of "packet_counter." After that, there are a field of "payload data" and a field of "source_FEC_payload_ID" that compose the MMTP payload.

FIG. 5(b) shows a configuration example of the MMT extension header. A 16-bit field of "type" indicates a type of the extension header. A 16-bit field of "length" indicates a byte size of a subsequent extension header. The byte size of the extension header differs according to the type of the extension header. A field of "header_extension_byte" indicates a data byte for the header extension.

Figure 6:
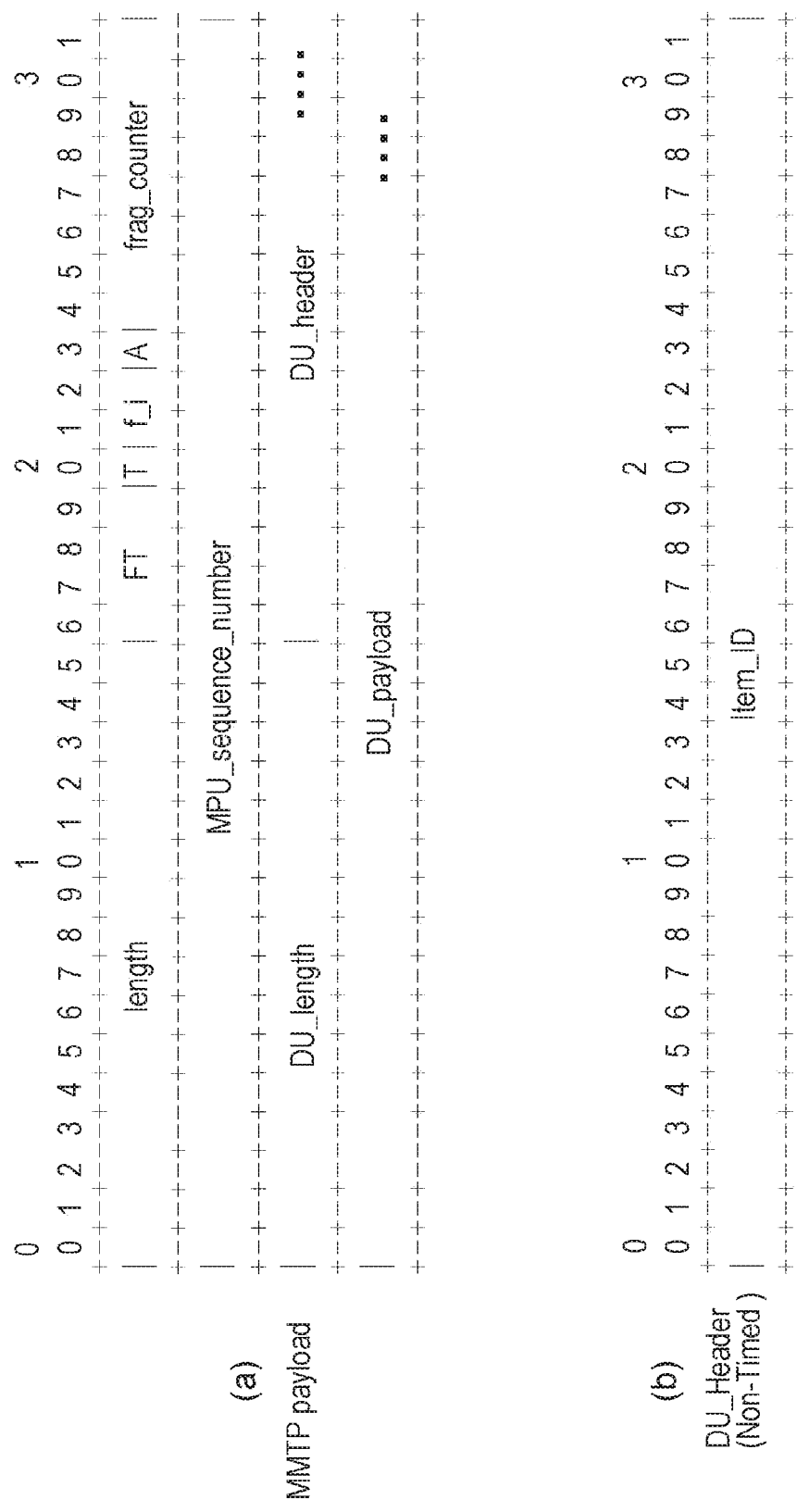
FIGS. 6(a) and 6(b) are a configuration example of an MMTP payload and a configuration example of "DU_header."

FIG. 6(a) shows a configuration example of an MMTP payload disposed in a field of "payload data" of the above MMT packet. Here, this example illustrates a case that the "type" of the MMT packet header is in an MPU mode, which is "0x00." At the beginning, there is header information. A 16-bit field of "length" indicates a payload length (payload_length). The payload length indicates a number of bytes from the immediately after this field to the end of the MMTP payload.

A 4-bit field of "FT" is fragment type (fragment_type) information and indicates a fragment type of information to be stored in the MMTP payload. "0" represents that "MPU metadata" is included, "1" represents that "movie fragment metadata" is included, and "2" represents that "MFU" is included.

A 1-bit field of "T" is time data flag (timed_flag) information and indicates whether the data stored in the MMTP payload is timed media that specify a presentation time or non-timed media that does not specify the presentation time. "1" represents timed media and "0" represents non-timed media. A file transmission is a transmission of non-timed media.

A 2-bit field of "f_i" is division index (fragment_indicator) information and indicates a division state of data stored in the MMTP payload. In other words, this field indicates whether an integer number of data unit (DU) is included in the field of "DU payload" and whether one of a first, a middle, and a last of the fragments obtained by fragmenting the data unit is included. "0" represents that the integer number of data unit is included, "1" represents that the first fragment is included, "2" represents that the middle fragment is included, and "3" represents that the last fragment is included.

A 1-bit field of "A" is aggregation flag (aggregation flag) information and indicates whether two or more pieces of data are stored in the MMTP payload, which means that this flag information indicates whether more than one data units are included in the field of "DU payload." "1" represents that more than one data units are included and "0" represents that more than one data units are not included.

An 8-bit field of "frag_counter" is fragment counter (fragment_counter) information and indicates, when the data is divided, a number of divided pieces of data disposed after a part where the MMTP payload is stored. A 32-bit field of "MPU_sequence_number" is a number indicating an order of the MPU and is information for identifying the MPU.

After the field of this "MPU_sequence_number," each field of "DU_length," "DU_header," and "DU_payload" are disposed. The 16-bit field of "DU_length" does not exist when the above "A" is "0," which means that more than one data units are not included in the field of "DU payload." Further, the field of "DU_header" does not exist when "FT" is "0" or "1," which means "MPU metadata" or "movie fragment metadata" is included.

FIG. 6(b) shows a configuration example of the "DU_header." Here, this example shows a case that "T" is "0," that is, a case of transmitting a non-timed media. A 32-bit field of "item_ID" is an ID to identify an item (file).

[Insertion of Divided Data Identification Information]

As described above, in the MMT payload header, there is an 8-bit field of "frag_counter." Thus, the file is divided into more than one pieces and, when each piece of the divided data is respectively stored in a single MMTP payload, each piece of the divided data can be identified by the value of the "frag_counter" field if the total number of dividing is equal to or less than 256. However, when the total number of the file division exceeds 256, it is difficult to identify the pieces of the divided data stored in the MMTP payload only with the "frag_counter" field.

According to the present embodiment, when the total number of dividing exceeds 256, identification information to identify the divided data included in the MMT packet is inserted in the MMT packet and transmitted. With this, in the reception side, even when the total number of the file division exceeds 256, each piece of the divided data can be identified.

[Transmitting Method 1]

Firstly, a transmitting method 1 will be explained. In the transmitting method 1, an MMT extension header of an MMT packet including an MPU (MFU) (see FIGS. 5(a) and 5(b)) is used. In this case, order information that indicates an order of the divided data and total number information that indicates a total number of divided data are disposed in an extension header (header_extension) of the MMT packet including the divided data.

Figure 7:
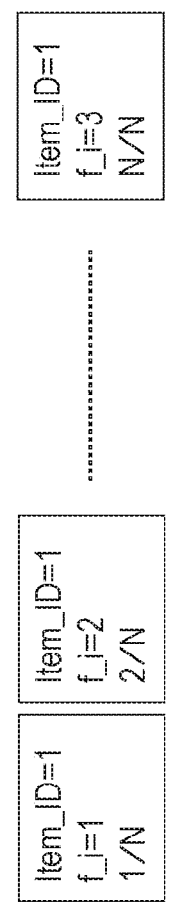
FIG. 7 is a diagram schematically showing N number of MMT packets that respectively include each piece of divided data of a file when an identification information transmitting method 1 is used.

FIG. 7 schematically shows N number of MMT packets which include each piece of the divided data of a file in a case that the transmitting method 1 is employed. In the N number of MMT packets, "1," "2," "3," etc. are the order number indicating the order of the divided data and "N" is the total number information indicating the total number of the pieces of divided data.

Since the divided data to be included in the N number of MMT packets is obtained by dividing a single file into N number pieces, the values of "item_ID" that indicate the file ID are the same, which is "1" in this example. Further, among the N number of MMT packets, the "f_i" value of the first MMT packet is set as "1," the "f_i" value of the last MMT packet is set as "3," and the "f_i" value of another MMT packets is set as "2."

Figure 8:
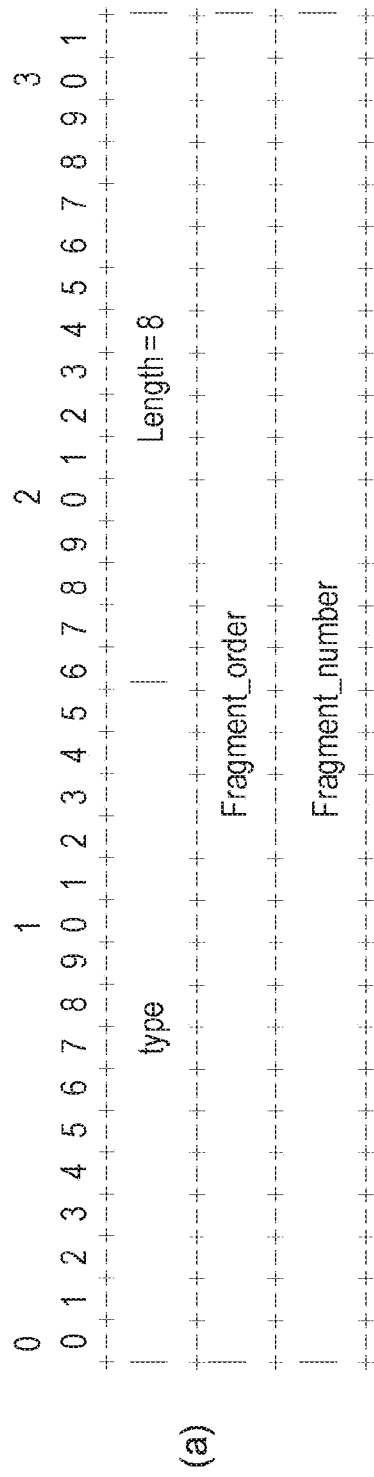
FIGS. 8(a) and 8(b) are diagrams showing a configuration example of an extension header (header_extension) to which order information and total number information are inserted, and the content of major information in the configuration example.

FIG. 8(a) shows a configuration example of an extension header (header_extension) in which order information and total number information are inserted. FIG. 8(b) shows the content of major information of the configuration example. A 16-bit field of "type" indicates an extension type (extension header type) of an extension header area. In this case, it is assumed as a unique type value that stores fragment transmission information.

A 16-bit field of "length" indicates a number of bytes of the extension header area (extension header length). In the case of this type, a fixed 8 is set. A 32-bit field of "Fragment_order" indicates an order of the fragment (divided data) in the same "item_id." A 32-bit field of "Fragment_number" indicates the total number of the fragments (divided data) in the same "item_id."

In this manner, with the transmitting method 1, when the total number of the file division exceeds 256, in the extension header of the MMT packet including each piece of the divided data, order information of the divided data and total number information of the divided data are inserted. Thus, in the reception side, even when the file size is large and the total number of division exceeds 256, each piece of the divided data can be identified and this makes it easier to obtain all the pieces of divided data and reconfigure the file.

In the reception side, when MMT packets of fragmented files indicating "f_i" of 1 to 3 are received, the following management is performed for the MMT packets having the same "item_id" value. In other words, when there is no extension header (header_extension), received fragments (divided data) are arranged according to the "frag_counter" values in the MMTP payload and, when there is an extension header, the received fragments (divided data) are arranged according to the "Fragment_order" value in the extension header so as to manage them as a single file when all fragments are obtained.

Here, when there is a missing fragment number, the packet of the corresponding fragment number is selectively received to compensate in a following cycle of the repeated transmission and the compensation is suspended until all of the fragments are received. As described above, when there is no extension header area, the fragment number is indicated by the "frag_counter" value in the MMTP payload and, when there is an extension header area, the fragment number is indicated by the "Fragment_order" value in the extension header.

[Transmitting Method 2]

Next, a transmitting method 2 will be explained. In the transmitting method 2, an originally single file is divided in to a plurality of files (items) and transmitted in a manner of that the plural files are concatenated to each other. In this case, dividing is executed to make a plurality of files so that the number of the pieces of divided data respectively included therein becomes equal to or less than 256.

Further, in the transmitting method 2, an MMT packet including a data transmission message (see FIG. 3) is used. In this case, an item concatenation descriptor (item_concatenation_descriptor) having above described concatenation information of the plurality of files is disposed in a region of "item_info" of the data asset management table included in the data transmission message.

More specifically, it is assumed that "item_id" values of the files to be concatenated are successive, and the item concatenation descriptor is disposed in the "item_info" field of the first concatenated file (item). Then, specifying the "item_id" value of the last concatenated file means that the concatenation therebetween has done in the order of "item_id." Further, in the item concatenation descriptor, version information, size information, the number of fragments (the total number of dividing) of the entire concatenated files are written.

Figure 9:
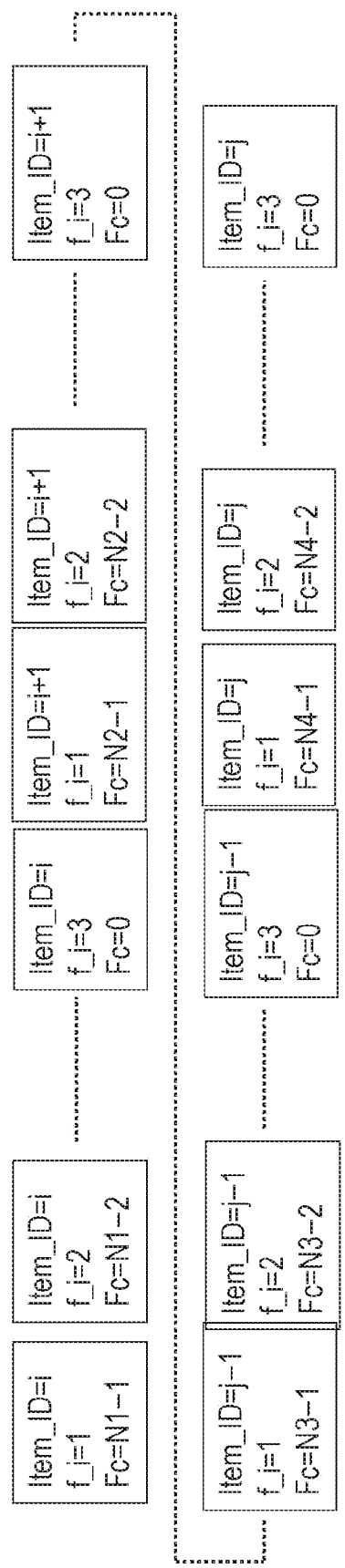
FIG. 9 is a diagram schematically showing MMT packets that respectively include divided data that composes the plurality of files obtained by dividing a single file, in a case that the identification information transmitting method 2 is used.

FIG. 9 schematically shows MMT packets that respectively include each piece of divided data of the plurality of files obtained by dividing a single file in a case that the transmitting method 2 is employed. The "item_ID" value of the first file is "i" and the first file includes N1 number of pieces of divided data. Then, regarding the N1 number of MMT packets, "frag_counter" ("Fc" in the drawing) values are sequentially changed from "N1−1" to "0." Further, regarding the N1 number of MMT packets (N1 is equal to or less than 256), the "f_i" value of the first MMT packet is set as "1," the "f_i" value of the last MMT packet is set as "3," and the "f_i" value of another MMT packet is set as "2."

The item_ID" value of the second file is "i+1," and the second file includes N2 number of pieces of divided data (N2 is equal to or less than 256). Then, regarding the N2 number of MMT packets, the "frag_counter" ("Fc" in the drawing) values are sequentially changed from "N2−1" to "0." Further, regarding the N2 number of MMT packets, the "f_i" value of the first MMT packet is set as "1," the "f_i" value of the last MMT packet is set as "3," and the "f_i" value of another MMT packet is set as "2."

Further, the "item_ID" value of the last file is "j" and the last file includes N4 number of pieces of divided data (N4 is equal to or less than 256). Then, regarding the N4 number of the MMT packets, "frag_counter" ("Fc" in the drawing) values are sequentially changed from "N4−1" to "0." Further, regarding the N4 number of the MMT packets, the "f_i" value of the first MMT packet is set as "1," the "f_i" value of the last MMT packet is set as "3," and the "f_i" value of another MMT packet is set as "2."

In this transmitting method 2, as shown in the drawings, it is found that the MMT packets of each divided data which is originally a single file can be identified by the two values of "item_ID" and "frag_counter" ("Fc" in the drawings).

FIG. 10 shows a configuration example of a data transmission message. A 16-bit field of "message_id" is an identifier of a signaling message and indicates that it is a data transmission message in this example. An 8-bit field of "Version" indicates a version number of the data transmission message. A 32-bit field of "length" indicates, with a number of bytes, the data size of the message following after the field.

An 8-bit field of "num_of_table" indicates the number of tables stored in the data transmission message. In the data transmission message, the following information is disposed in each table. A 16-bit field of "table_id" indicates an identifier of a table. An 8-bit field of "table_version" indicates a version of the table. A 16-bit field of "table_length" indicates, with a number of bytes, a size of the table. Then, the table is placed in the "table( )" field.

FIG. 11 shows a configuration example of a data asset management table. An 8-bit field of "table_id" is an identifier of a table and indicates that it is a data asset management table in this example. An 8-bit field of "version" indicates a version number of the data asset management table. A 16-bit field of "length" indicates, with the number of bytes, a data size of the table following after the field.

An 8-bit field of "number_of_asset" indicates the number of assets. This table is formed to include information of the plurality of assets. In this table, information is disposed for each asset. An 8-bit field of "number_of_items" indicates the number of items (files). Then, information is disposed in each file.

A 32-bit field of "item_ID" indicates an ID to identify an item (file) to be transmitted by a non-timed MFU. A 16-bit field of "item_tag" is information to identify the item in the similar manner. As signaling information, by using a 16-bit "item_tag" as a substitute for the 32-bit "item_ID," the bit size to identify the item can be reduced. An 8-bit field of "item_version" indicates a version of the item.

An 8-bit field of "item_info_length" indicates, with a number of bytes, a size of the "item_info" field. In the "item_info" field, information related to the item is stored. The above described item concatenation descriptor (item_concatenation_descriptor) is inserted in the "item_info" field.

FIG. 12 shows a configuration example of the item concatenation descriptor. FIG. 13 shows the content of major information in the configuration example. A 16-bit field of "descriptor_tag" indicates a descriptor type. In this example, an item concatenation descriptor is indicated. An 8-bit field of "descriptor_length" indicates a size of the descriptor and indicates the number of bytes after this field.

An 8-bit field of "concatenated_item_version" indicates a version number of the entire concatenated items (files). The version number changes when an item_version of the composing items changes. A 32-bit field of "concatenated_item_size" indicates, in kilobytes, a size of the entire concatenated items.

A 32-bit field of "total_number_of_item_fragments" indicates the number of fragments (divided data) of the entire concatenated items. A 32-bit field of "end_item_id" indicates an "item_id" value of the last concatenated item. The items are concatenated in order of the subsequent "item_id" having the item in which the descriptor is set to be the first item.

In this manner, with the transmitting method 2, when the total number of dividing of an originally single file exceeds 256, the single file is divided into a plurality of files so that the number of the pieces of respectively included divided data becomes equal to or less than 256. Then, in the region of "item_info" in the data asset management table, the item concatenation descriptor including concatenation information of the plurality of files is disposed. Thus, in the reception side, even when the file size is large and the total number of dividing exceeds 256, each piece of the divided data can be identified and this makes it easier to obtain all the divided data and reconfigure the original single file.

In the reception side, when receiving MMT packets of a fragmented file with "f_i" of 1 to 3, the following management is performed. In other words, in general, regarding the MMT packets having the same "item_id" value, the fragments (divided data) received according to "frag_counter" value of the MMTP payload are arranged and managed as a single file when all fragments are received.

On the other hand, when there is an item concatenation descriptor in a particular "item_info" field in the data asset management table, based on the description, for each file, the fragments (divided data) received according to the "frag_counter" value of the MMTP payload are arranged, regarding the MMT packets having the same "item_id" value. Further, the fragments (divided data) of each file are concatenated and arranged from the first file in order of the "item_id" value and then managed as a single file when all fragments are received.

Here, when there is a missing fragment number, the packet of the corresponding number is selectively received and compensated in the next cycle of repeated transmission, and the compensation is suspended until all the fragments are obtained. As described above, the fragment number is generally represented by a "frag_counter" value of the MMTP payload and, when an item concatenation descriptor including concatenation information of the plurality of files is disposed, is represented by the "item_id" value to identify each concatenated file and the "frag_counter" value of the MMTP payload.

[Configuration of Broadcasting Delivery System]

Figure 14:
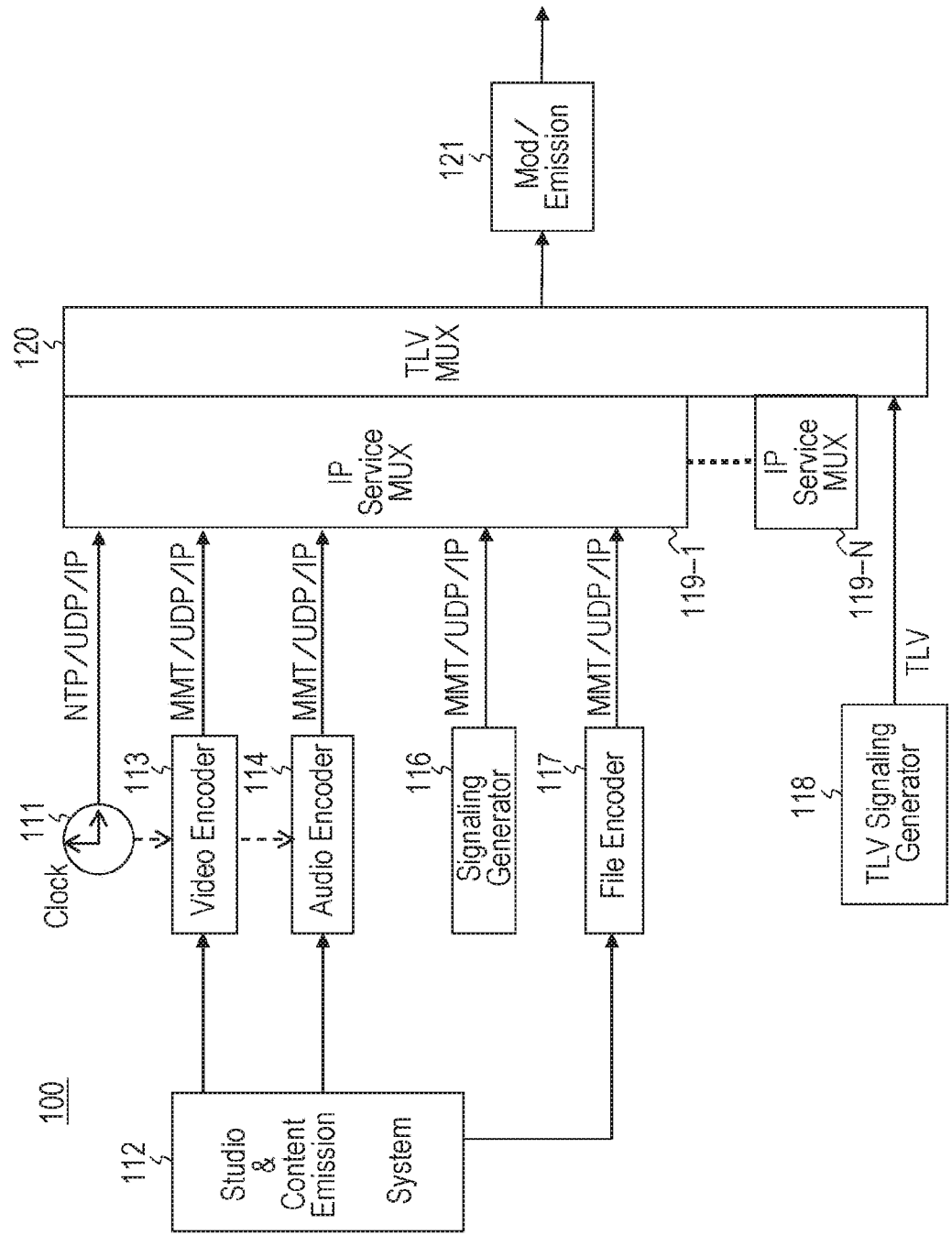
FIG. 14 is a block diagram showing a configuration example of the broadcasting delivery system.

FIG. 14 shows a configuration example of the broadcasting delivery system 100. The broadcasting delivery system 100 includes a clock unit 111, a signal transmitting unit 112, a video encoder 113, an audio encoder 114, a signaling generator 116, and a file encoder 117. Further, the broadcasting delivery system 100 includes a TLV signaling generator 118, N number of IP service multiplexers 119-1 to 119-N, a TLV-multiplexer 120, and a modulator/transmitter 121.

The clock unit 111 generates time information (NTP time information) synchronized with time information obtained from an unillustrated Network Time Protocol (NTP) server and transmits an IP packet including the time information to the IP service multiplexer 119-1. The signal transmitting unit 112 is a studio in a TV broadcast station or a player of a record such as a VTR for example and transmits stream data of timed media such as video, audio, subtitles and the like and a file (file data) of non-timed media such as HTML text data and the like to each encoder.

The video encoder 113 encodes and further packetizes a video signal transmitted from the signal transmitting unit 112 and transmits an IP packet including an MMT packet of the video to the IP service multiplexer 119-1. The audio encoder 114 encodes and further packetizes an audio signal transmitted from the signal transmitting unit 112 and transmits an IP packet including an MMT packet of the audio to the IP service multiplexer 119-1.

The signaling generator 116 generates a signaling message and transmits an IP packet including an MMT packet having the signaling message in its payload part to the IP service multiplexer 119-1.

Figure 5:
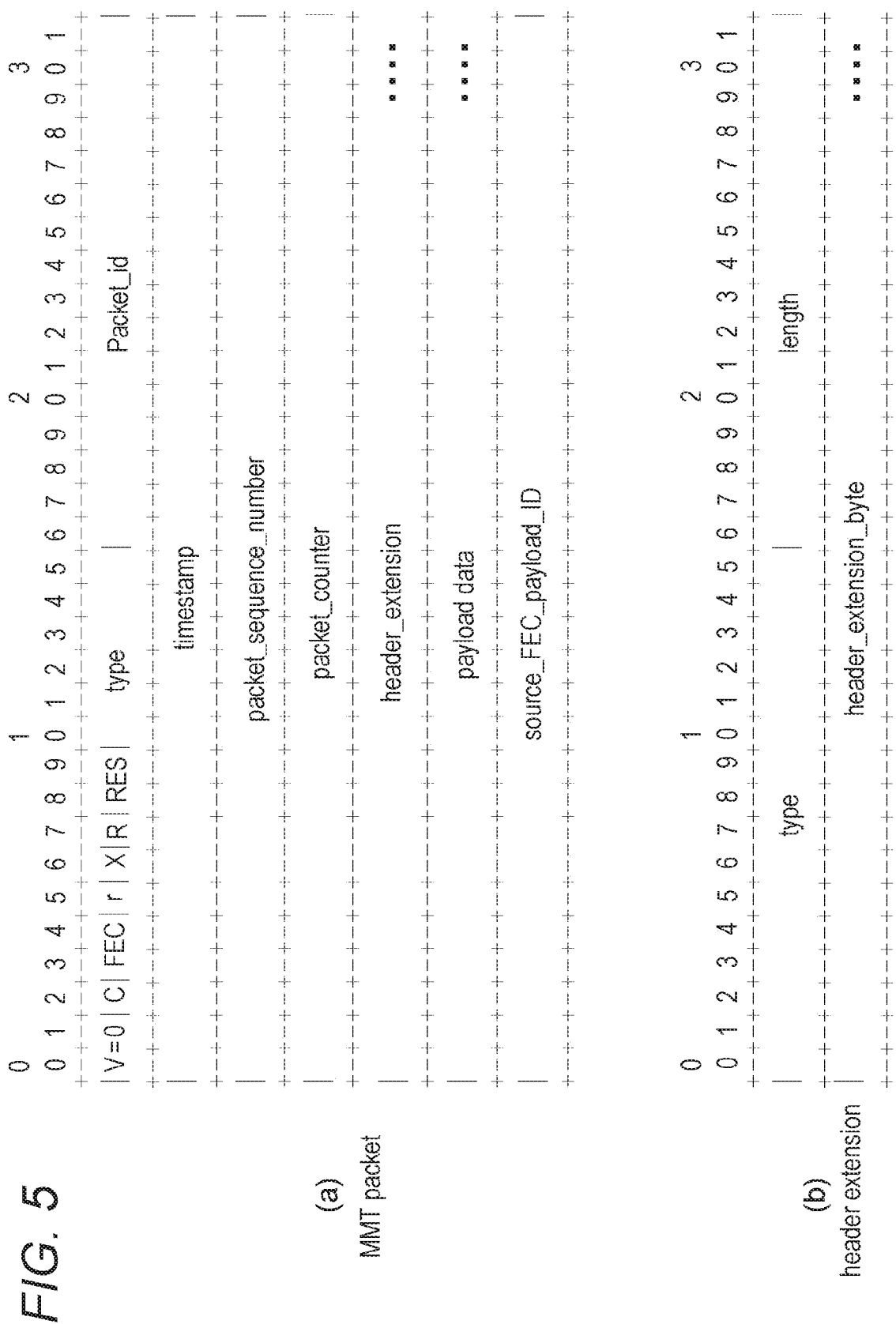
FIGS. 5(a) and 5(b) are diagrams showing a configuration example of an MMT packet and a configuration example of an MMT extension header.

The file encoder 117 combines or divides a file (file data) transmitted from the signal transmitting unit 112 according to need, generates an MMT packet including the file (see FIGS. 5 (a) and 5 (b)), and transmits an IP packet including the MMT packet to the IP service multiplexer 119-1.

When the above described transmitting method 1 is employed, in the case that the total number of file division exceeds 256, the file encoder 117 disposes an extension header (header_extension) in the MMT packet including each divided data and inserts order information of the divided data and total number information of the divided data. Further, when the above described transmitting method 2 is employed, in the case that the total number of file division exceeds 256, the file encoder 117 divides the file into a plurality of files so that the number of the pieces of respectively included divided data becomes equal to or less than 256.

Here, when the transmitting method 2 is employed, the above described signaling generator 116 disposes an item concatenation descriptor (item_concatenation_descriptor) including concatenation information of the plurality of files in the "item_info" field of a data asset management table included in a data transmission message as a signaling message.

The IP service multiplexer 119-1 performs time-division multiplexing on the IP packet transmitted from each encoder or the like. In this case, the IP service multiplexer 119-1 adds a TLV header to each IP packet and configures a TLV packet.

The IP service multiplexer 119-1 composes a channel part to be inserted in a single transponder. The IP service multiplexers 119-2 to 119-N have a function similar to that of the IP service multiplexer 119-1 and compose other channel parts to be inserted in the single transponder.

The TLV signaling generator 118 generates signaling information and generates a TLV packet in which the signaling information is disposed in its payload part. The TLV-multiplexer 120 multiplexes the TLV packets generated in the IP service multiplexers 119-1 to 119-N and TLV signaling generator 118 and generates a broadcast stream. The modulator/transmitter 121 performs an RF modulation process on the broadcast stream generated in the TLV-multiplexer 120 and sends out the broadcast stream to an RF transmission path.

An operation of the broadcasting delivery system 100 shown in FIG. 14 will be briefly explained. In the clock unit 111, time information synchronized with the time information obtained from an NTP server is generated and an IP packet including the time information is generated. This IP packet is transmitted to the IP service multiplexer 119-1.

The video signal sent out from the signal transmitting unit 112 is supplied to the video encoder 113. In the video encoder 113, a video signal is encoded and further packetized and an IP packet including an MMT packet of the video is generated. This IP packet is transmitted to the IP service multiplexer 119-1. Further, a similar process is executed on an audio signal sent out from the signal transmitting unit 112. Then, the IP packet including an MMT packet of the audio generated in the audio encoder 114 is transmitted to the IP service multiplexer 119-1.

Further, in the signaling generator 116, a signaling message is generated and an IP packet including an MMT packet in which the signaling message is disposed in its payload part is generated. This IP packet is transmitted to the IP service multiplexer 119-1.

Further, the file sent out from the signal transmitting unit 112 is supplied to the file encoder 117. In the file encoder 117, files are combined or divided according to need, an MMT packet including the files is generated, and an IP packet including the MMT packet is generated. This IP packet is transmitted to the IP service multiplexer 119-1.

In the IP service multiplexer 119-1, time-division multiplexing is performed on the IP packet transmitted from each encoder and the signaling generator 116. In this case, a TLV header is added to each IP packet and configures a TLV packet. In the IP service multiplexer 119-1, a process is executed on a channel part to be inserted to a single transponder and, in the IP service multiplexers 119-2 to 119-N, a similar process is executed on other channel parts to be inserted to the single transponder.

The TLV packet obtained in the IP service multiplexers 119-1 to 119-N is transmitted to the TLV-multiplexer 120. To the TLV-multiplexer 120, a TLV packet in which signaling information is disposed in its payload part is transmitted from the TLV signaling generator 118.

In the TLV-multiplexer 120, TLV packets generated in the IP service multiplexers 119-1 to 119-N and TLV signaling generator 118 are multiplexed and a broadcast stream is generated. This broadcast stream is transmitted to the modulator/transmitter 121. In the modulator/transmitter 121, an RF modulation process is executed on the broadcast stream and an RF modulation signal is sent out to the RF transmission path.

[Receiver Configuration]

Figure 15:
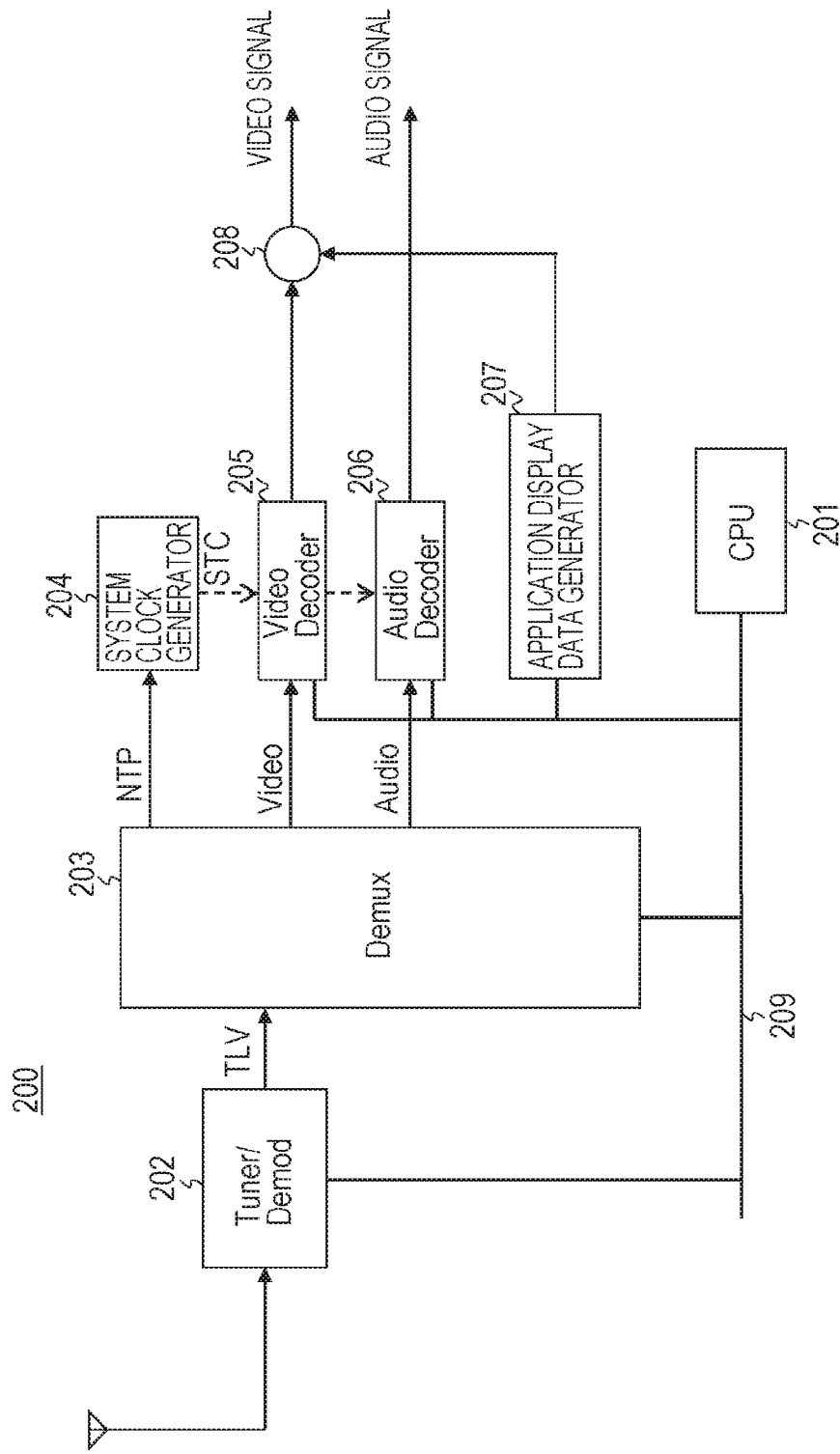
FIG. 15 is a block diagram showing a configuration example of a receiver.

FIG. 15 shows a configuration example of the receiver 200. The receiver 200 includes a CPU 201, a tuner/demodulator 202, a demultiplexor 203, a system clock generator 204, a video decoder 205, an audio decoder 206, an application display data generator 207, and a combining unit 208.

The CPU 201 composes a control unit and controls operations of each unit of the receiver 200. The tuner/demodulator 202 receives an RF modulation signal, performs a demodulation process, and obtains a broadcast stream. The demultiplexor 203 executes a demultiplexing process and a depacketizing process on the broadcast stream and outputs NTP time information, presentation time information (PTS), signaling information, encoded signal of video and audio, and a file (file data). Here, for example, the file composes data broadcasting content.

When a file is divided into fragments and transmitted as a plurality of pieces of divided data, the multiplexer 203 reconfigures the file by arranging the plurality of pieces of divided data in order. When the total number of file division is equal to or less than 256, regarding MMT packets having the same "item_id" value, fragments (divided data) received according to the "frag_counter" values in the MMTP payload are arranged and the file is reconfigured.

Further, when the total number of the file division exceeds 256, the multiplexer 203 reconfigures the file as follows. When the above described transmitting method 1 is being employed, regarding MMT packets having the same "item_id" value, the fragments (divided data) received according to the "Fragment_order" values of the extension header are arranged and the file is reconfigured.

On the other hand, when the above described transmitting method 2 is being employed, according to the description of the item concatenation descriptor in a particular "item_info" field in the data asset management table, for each file, regarding MMT packets having the same "item_id" value, the fragments (divided data) received according to the "frag_counter" values in the MMTP payload are arranged. Further, the file (original single file) is reconfigured by concatenating and arranging the fragments (divided data) of each file from the first file in order of the "item_id" value.

Here, when there is a missing fragment number, the demultiplexor 203 selectively receives and compensates the packet of the corresponding fragment number in a following cycle of repeated transmission.

In the system clock generator 204, on the basis of the NTP time information obtained in the demultiplexor 203, a system clock STC synchronized with the time information is generated. The video decoder 205 decodes an encoded video signal obtained in the demultiplexor 203 and obtains a video signal of baseband. The audio decoder 206 decodes an encoded audio signal obtained in the demultiplexor 203 and obtains an audio signal of baseband.

The application display data generator 207 obtains display data of data broadcasting based on the file (file data) obtained in the demultiplexor 203 under the control of the CPU 201. Here, in the broadcast stream, files having the same content are repeatedly transmitted. The CPU 201 controls a filtering operation in the demultiplexor 203 so that only a necessary file is obtained in the demultiplexor 203.

The CPU 201 controls decode timing in each decoder on the basis of presentation time information (PTS) and adjusts presentation timing of the video and audio. The combining unit 208 combines display data of the data broadcasting generated in the application display data generator 207 with a video signal of the baseband obtained in the video decoder 205 and obtains a video signal for an image display. Here, the audio signal of the baseband obtained in the audio decoder 206 is an audio signal for audio output.

An operation of the receiver 200 shown in FIG. 15 will be briefly explained. In the tuner/demodulator 202, an RF modulation signal transmitted through the RF transmission path is received, a demodulation process is performed, and a broadcast stream is obtained. This broadcast stream is transmitted to the demultiplexor 203.

In the demultiplexor 203, a demultiplexing process and a depacketizing process are performed on the broadcast stream and NTP time information, signaling information, an encoded signal of video or audio, a file (file data) that composes the data broadcasting content, or the like are extracted.

The various types of signaling information extracted in the demultiplexor 203 is transmitted to the CPU 201 through a CPU bus 209. In the signaling information, TLV-SI and MMT-SI are included. As described above, the TLV-SI is a transmission control signal (TLV-NIT/AMT) that is disposed over the TLV transmission packet and the MMT-SI is a signaling message as signaling information included in the payload part of the MMT packet (see FIG. 2). The CPU 201 controls operations of each unit in the receiver 200 on the basis of the signaling information.

The NTP time information extracted in the demultiplexor 203 is transmitted to the system clock generator 204. In the system clock generator 204, on the basis of the NTP time information, a system clock STC synchronized with the time information is generated. The system clock STC is supplied to the video decoder 205 and the audio decoder 206.

The encoded video signal extracted in the demultiplexor 203 is transmitted to the video decoder 205 and encoded, and then a video signal of the baseband is obtained. Further, the file extracted in the demultiplexor 202 is transmitted to the CPU 201 through the CPU bus 209. The CPU 201 analyzes the file and executes a layout process and a rendering process and instructs the application display data generator 207 to generate display data. In the application display data generator 207, display data of the data broadcasting is generated on the basis of the instruction.

The video signal obtained in the video decoder 205 is supplied to the combining unit 208. Further, the display data generated in the application display data generator 207 is supplied to the combining unit 208. In the combining unit 208, the video signal and display data are combined and a video signal for an image display is obtained. Further, the encoded audio signal extracted in the demultiplexor 203 is transmitted to the audio decoder 206 and decoded, and an audio signal of the baseband for audio output is obtained.

As described above, in the transmitting and receiving system 10 illustrated in FIG. 1, when a file is divided into fragments and transmitted, in the case that the total number of the file division exceeds 256, identification information to identify each divided data is inserted to an MMT packet including the divided data or an MMT packet including a signaling message. Thus, in the reception side, even when the file size is large and the total number of dividing is large, each piece of the divided data can be identified and this makes it easier to obtain all the pieces of the divided data and reconfigure the file.

2. Modifications

Here, the above described embodiment has explained that, in the transmitting method 1, order information (a fragment number) of divided data included in an MMT packet is inserted to an extension header of the MMT packet. However, it may be considered that a value that, for example, increments every time the 8-bit field of "frag_counter" changes from "0" to "255" is inserted to the extension header of the MMT packet without inserting the order information (fragment number) of the divided data included in the MMT packet. In this case, the value and the value of the 8-bit field of the "frag_counter" become order information of the divided data included in the MMT packet.

Further, the above described embodiment has given an example that the transmission packet is an MMT packet; however, it does not set any limitation and the present technology can be applied to handle another similar transmission packet.

Further, the present technology may have following configurations.

(1) A transmitting apparatus including:
a transmission stream generating unit configured to generate a transmission stream in which a first transmission packet including transmission media and a second transmission packet including information related to the transmission media are time-division multiplexed; and
a transmission stream transmitting unit configured to transmit the transmission stream to a reception side through a predetermined transmission path,
wherein, when the transmission media included in the first transmission packet is divided data of a file that composes predetermined content,
the transmission stream generating unit
disposes, in a header of the first transmission packet, an extension header having order information that indicates an order of the divided data included in the first transmission packet and total number information that indicates a total number of the divided data.

(2) The transmitting apparatus according to (1), wherein the transmission packets are MMT packets.

(3) A transmitting method including:
a transmission stream generating step of generating a transmission stream in which a first transmission packet including transmission media and a second transmission packet including information related to the transmission media are time-division multiplexed; and
a transmission stream transmitting step of transmitting, by a transmission unit, the transmission stream to a reception side through a predetermined transmission path,
wherein, when the transmission media included in the first transmission packet is divided data of a file that composes predetermined content,
in the transmission stream generating step,
an extension header having order information that indicates an order of the divided data included in the first transmission packet and total number information that indicates a total number of the divided data is disposed in a header of the first transmission packet.

(4) A receiving apparatus including a transmission stream receiving unit configured to receive, from a transmission side through a predetermined transmission path, a transmission stream in which a first transmission packet including transmission media and a second transmission packet including information related to the transmission media are time-division multiplexed,
wherein, when the transmission media included in the first transmission packet is divided data of a file that composes predetermined content, an extension header having order information that indicates an order of the divided data included in the first transmission packet and total number information that indicates a total number of the divided data is disposed in a header of the first transmission packet, the receiving apparatus further including a file acquisition unit configured to acquire, from the transmission stream, the file by filtering the first transmission packets that respectively include each divided data of the file that composes the predetermined content based on the order information and the total number information.

(5) A transmitting apparatus including:
a transmission stream generating unit configured to generate a transmission stream in which a first transmission packet including transmission media and a second transmission packet including information related to the transmission media are time-division multiplexed; and
a transmission stream transmitting unit configured to transmit the transmission stream to a reception side through a predetermined transmission path,
wherein, when the transmission media included in the first transmission packet is divided data of a file that composes predetermined content and a total number of dividing exceeds a predetermined number,
the transmission stream generating unit
divides the file into a plurality of files so that the number of the respectively included divided data becomes equal to or less than the predetermined number and
inserts concatenation information of the plurality of files in the second transmission packet.

(6) The transmitting apparatus according to (5), wherein, in the concatenation information of the plurality of files, total number information that indicates a total number of the divided data is added.

(7) The transmitting apparatus according to (5) or (6), wherein the transmission packets are MMT packets, and the predetermined number is 256.

(8) The transmitting apparatus according to (7), wherein the concatenation information of the plurality of files is inserted in a data asset management table included in a data transmission message.

(9) The transmitting apparatus according to (8),
wherein serial file identifiers are applied to the plurality of files,
the concatenation information of the plurality of files is inserted to the data asset management table as information of a first file of the plurality of files, and
the file identifier of a last file of the plurality of files is included in the concatenation information of the plurality of files.

(10) A transmitting method including:
a transmission stream generating step of generating a transmission stream in which a first transmission packet including transmission media and a second transmission packet including information related to the transmission media are time-division multiplexed; and
a transmission stream transmitting step of transmitting, by a transmission unit, the transmission stream to a reception side through a predetermined transmission path,
wherein, when the transmission media included in the first transmission packet is divided data of a file that composes predetermined content, and a total number of dividing exceeds a predetermined number,
in the transmission stream generating step,
the file is divided into a plurality of files so that the number of the respectively included divided data becomes equal to or less than the predetermined number, and
concatenation information of the plurality of files is inserted in the second transmission packet.

(11) A receiving apparatus including:
a transmission stream receiving unit configured to receive, from a transmission side through a predetermined transmission path, a transmission stream in which a first transmission packet including transmission media and a second transmission packet including information related to the transmission media are time-division multiplexed,
wherein, when the transmission media included in the first transmission packet is divided data of a file that composes predetermined content, and a total number of dividing exceeds a predetermined number, the file is divided into a plurality of files so that the number of the respectively included divided data becomes equal to or less than the predetermined number and concatenation information of the plurality of files is inserted in the second transmission packet, the receiving apparatus further including a file acquisition unit configured to acquire the file from the transmission stream by filtering the first transmission packets respectively including each divided data of the file that composes the predetermined content based on the concatenation information of the plurality of files.

(12) A transmitting apparatus including:
a transmission stream generating unit configured to generate a transmission stream in which a first transmission packet including transmission media and a second transmission packet including information related to the transmission media are time-division multiplexed;
a transmission stream transmitting unit configured to transmit the transmission stream to a reception side through a predetermined transmission path; and
an identification information inserting unit configured to insert identification information for identifying divided data included in the first transmission packet into the first transmission packet and/or the second transmission packet when the transmission media included in the first transmission packet is divided data of a file that composes predetermined content and a total number of dividing exceeds a predetermined number.

(13) A receiving apparatus including:
a transmission stream receiving unit configured to receive, from a transmission side through a predetermined transmission path, a transmission stream in which a first transmission packet including transmission media and a second transmission packet including information related to the transmission media are time-division multiplexed,
wherein, when the transmission media included in the first transmission packet is divided data of a file that composes predetermined content and a total number of dividing exceeds a predetermined number, identification information for identifying the divided data included in the first transmission packet is inserted into the first transmission packet and/or the second transmission packet,
the receiving apparatus further including a file acquisition unit configured to acquire the file from the transmission stream by filtering the first transmission packets respectively including each divided data of the file that composes the predetermined content based on the identification information.

(14) A transmitting apparatus includes
a transmission stream generating unit configured to generate a transmission stream in which a first MMT packet including transmission media and a second MMT packet including information related to the transmission media are time-division multiplexed, and
a transmission stream transmitting unit configured to transmit the transmission stream to a reception side through a predetermined transmission path, and
when the transmission media included in the first MMT packet is divided data of a file that composes predetermined content,
the transmission stream generating unit
disposes, in a header of the first MMT packet, an extension header having a 32-bit field to which order information that indicates an order of the divided data included in the first MMT packet is inserted.

(15) A transmitting apparatus includes
a transmission stream generating unit configured to generate a transmission stream in which a first MMT packet including transmission media and a second MMT packet including information related to the transmission media are time-division multiplexed, and
a transmission stream transmitting unit configured to transmit the transmission stream to a reception side through a predetermined transmission path, and
when the transmission media included in the first MMT packet is divided data of a file that compose predetermined content,
the transmission stream generating unit
disposes, in a header of the first MMT packet, an extension header having a 32-bit field to which information related to a total number of the divided data is inserted.

(16) A transmitting apparatus includes
a transmission stream generating unit configured to generate a transmission stream in which a first MMT packet including transmission media and a second MMT packet including information related to the transmission media are time-division multiplexed, and
a transmission stream transmitting unit configured to transmit the transmission stream to a reception side through a predetermined transmission path, and
when the transmission media included in the first MMT packet is divided data of a file that composes predetermined content, a payload of the first MMT packet has an 8-bit field to which order information that indicates an order of the divided data is inserted, and
when the transmission media included in the first MMT packet is divided data of a file that composes predetermined content,
the transmission stream generating unit disposes, in a header of the first MMT packet, an extension header having a 32-bit field to which at least order information that indicates an order of the divided data included in the first MMT packet is inserted.

REFERENCE SIGNS LIST

10 Transmitting and receiving system
100 Broadcasting delivery system
111 Clock unit
112 Signal transmitting unit
113 Video encoder
114 Audio encoder
116 Signaling generator
117 File encoder
118 TLV signaling generator
119 IP service multiplexer
120 TLV multiplexer
121 Modulator/transmitter
200 Receiver
201 CPU
202 Tuner/demodulator
203 Demultiplexor
204 Clock unit
205 Video decoder
206 Audio decoder
207 Application display data generator
208 Combining unit

The invention claimed is:
1. A transmitting apparatus, comprising:
circuitry configured to:
generate a transmission stream, wherein
the transmission stream includes a first transmission packet and a second transmission packet, the first transmission packet and the second transmission packet are time-division multiplexed,
the first transmission packet includes a transmission media,
the second transmission packet includes information related to the transmission media, and
the transmission media included in the first transmission packet comprises a file that has a plurality of file fragments;
determine a count of the plurality of file fragments;
insert an extension header in a header of the first transmission packet based on the determination that the count of the plurality of file fragments exceeds a threshold number, wherein
the extension header includes order information that indicates an order of the plurality of file fragments in the first transmission packet and total number information that indicates the count of the plurality of file fragments of the file; and
transmit the transmission stream to a reception apparatus via a transmission path.

2. The transmitting apparatus according to claim 1, wherein each of the first transmission packet and the second transmission packet is a MPEG media transport (MMT) packet.

3. A transmitting method, comprising:
generating a transmission stream, wherein
the transmission stream includes a first transmission packet and a second transmission packet,
the first transmission packet and the second transmission packet are time-division multiplexed,
the first transmission packet includes a transmission media,
the second transmission packet includes information related to the transmission media, and
the transmission media included in the first transmission packet comprises a file that has a plurality of file fragments;
determining a count of the plurality of file fragments;
inserting an extension header in a header of the first transmission packet based on the determination that the count of the plurality of file fragments exceeds a threshold number, wherein
the extension header includes order information that indicates an order of the plurality of file fragments in the first transmission packet and total number information that indicates the count of the plurality of file fragments of the file; and
transmitting the transmission stream to a reception apparatus via a transmission path.

4. A receiving apparatus, comprising:
circuitry configured to:
receive, from a transmission apparatus via a transmission path, a transmission stream, wherein
the transmission stream includes a first transmission packet and a second transmission packet,
the first transmission packet and the second transmission packet are time-division multiplexed,
the first transmission packet includes a transmission media,
the second transmission packet includes information related to the transmission media,
the transmission media included in the first transmission packet comprises a file that has a plurality of file fragments,
a count of the plurality of file fragments is determined,
an extension header is inserted in a header of the first transmission packet based on the determination that the count of the plurality of file fragments exceeds a threshold number, and
the extension header includes order information that indicates an order of the plurality of file fragments in the first transmission packet and total number information that indicates the count of the plurality of file fragments of the file; and
acquire, from the transmission stream, the file based on a filter operation executed on the first transmission packet,
wherein the file is acquired based on the order information and the total number information.

5. A transmitting apparatus, comprising:
circuitry configured to:
generate a transmission stream, wherein
the transmission stream includes a first transmission packet and a second transmission packet,
the first transmission packet and the second transmission packet are time-division multiplexed,
the first transmission packet includes a transmission media,
the second transmission packet includes information related to the transmission media, and
the transmission media included in the first transmission packet comprises a file that has plurality of file fragments;
determine a count of the plurality of file fragments;
divide the file into a plurality of files based on the determination that the count of the plurality of file fragments exceeds a threshold number, wherein
each file of the plurality of files includes a specific number of file fragments, and
the specific number is one of equal to or less than the threshold number;
insert concatenation information of the plurality of files in the second transmission packet; and
transmit the transmission stream to a reception apparatus via a transmission path.

6. The transmitting apparatus according to claim 5, wherein the concatenation information of the plurality of files includes total number information that indicates the specific number of file fragments.

7. The transmitting apparatus according to claim 5, wherein
each of the first transmission packet and the second transmission packet is a MPEG media transport (MMT) packet, and
the threshold number is 256.

8. The transmitting apparatus according to claim 7, wherein the concatenation information of the plurality of files is inserted in a data asset management table in a data transmission message.

9. The transmitting apparatus according to claim 8, wherein
a plurality of serial file identifiers is applied to each of the plurality of files,
the concatenation information of the plurality of files is inserted to the data asset management table as information of a first file of the plurality of files, and
a file identifier of the plurality of serial file identifiers of a last file of the plurality of files is included in the concatenation information of the plurality of files.

10. A transmitting method, comprising:
generating a transmission stream, wherein
the transmission stream includes a first transmission packet and a second transmission packet, the first transmission packet and the second transmission packet are time-division multiplexed,
the first transmission packet includes a transmission media,
the second transmission packet includes information related to the transmission media, and
the transmission media included in the first transmission packet comprises a file that has plurality of file fragments;
determining a count of the plurality of file fragments;
dividing the file into a plurality of files based on the determination that the count of the plurality of file fragments exceeds a threshold number, wherein:
each file of the plurality of files includes a specific number of file fragments, and
the specific number is one of equal to or less than the threshold number;
inserting concatenation information of the plurality of files in the second transmission packet; and
transmitting the transmission stream to a reception apparatus via a transmission path.

11. A receiving apparatus, comprising:
circuitry configured to:
receive, from a transmission apparatus via a transmission path, a transmission stream, wherein
the transmission stream includes a first transmission packet and a second transmission packet,
the first transmission packet and the second transmission packet are time-division multiplexed,
the first transmission packet includes a transmission media,
the second transmission packet includes information related to the transmission media,
the transmission media included in the first transmission packet comprises a file that has plurality of file fragments,
a count of the plurality of file fragments is determined,
the file is divided into a plurality of files based on the determination that the count of the plurality of file fragments exceeds a threshold number,
each file of the plurality of files includes a specific number of file fragments,
the specific number of file fragments of each file of the plurality of files is one of equal to or less than the threshold number, and
concatenation information of the plurality of files is in the second transmission packet, and
acquire the file from the transmission stream based on a filter operation executed on the first transmission packet,
wherein the file is acquired based on the concatenation information of the plurality of files.

12. A transmitting apparatus, comprising:
circuitry configured to:
generate a transmission stream, wherein
the transmission stream includes a first transmission packet and a second transmission packet,
the first transmission packet and the second transmission packet are time-division multiplexed, and
the first transmission packet includes a transmission media,
the second transmission packet includes information related to the transmission media;
transmit the transmission stream to a reception apparatus via a transmission path; and
insert identification information to identify a plurality of file fragments of a file included in the first transmission packet, wherein
the file has the plurality of file fragments,
a count of the plurality of file fragments is determined;
the identification information is inserted in at least one of the first transmission packet or the second transmission packet based on:
the transmission media included in the first transmission packet; and
the determination that the count of the plurality of file fragments exceeds a threshold number, and
wherein the identification information includes order information that indicates an order of the plurality of file fragments in the first transmission packet and total number information that indicates the count of the plurality of file fragments of the file.

13. A receiving apparatus, comprising:
circuitry configured to:
receive, from a transmission apparatus via a transmission path, a transmission stream, wherein
the transmission stream includes a first transmission packet and a second transmission packet,
the first transmission packet and the second transmission packet are time-division multiplexed,
the first transmission packet includes a transmission media, and the second transmission packet includes information related to the transmission media,
the transmission media included in the first transmission packet is a file that has a plurality of file fragments,
a count of the plurality of file fragments is determined;
identification information to identify the plurality of file fragments is included in the first transmission packet based on the determination that the count of the plurality of file fragments exceeds a threshold number,
the identification information includes order information that indicates an order of the plurality of file fragments in the first transmission packet and total number information that indicates the count of the plurality of file fragments of the file, and
the identification information is inserted into at least one of the first transmission packet or the second transmission packet based on the transmission media included in the first transmission packet; and
acquire the file from the transmission stream based on a filter operation executed on the first transmission packet,
wherein the file is acquired based on the identification information.

* * * * *